Aug. 8, 1950     R. A. ADAMSON     2,518,265
ELECTRICALLY HEATED SOLDERING IRON
Filed Nov. 26, 1946
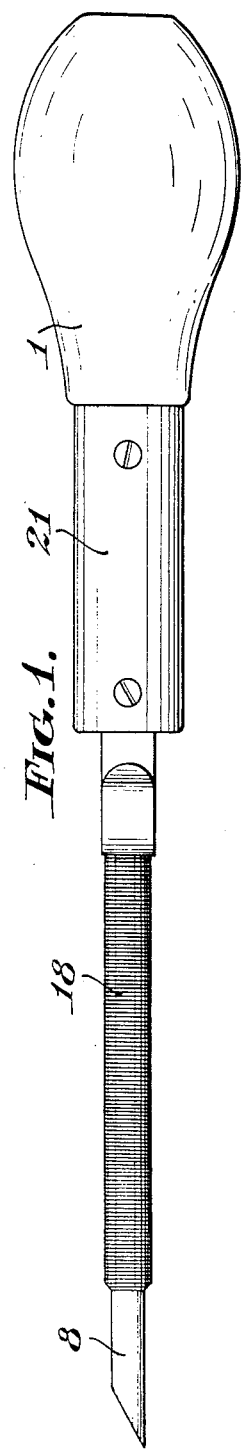
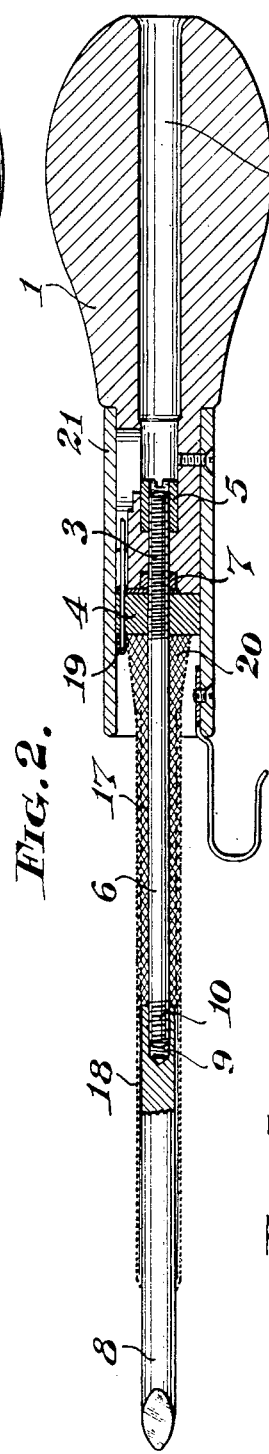
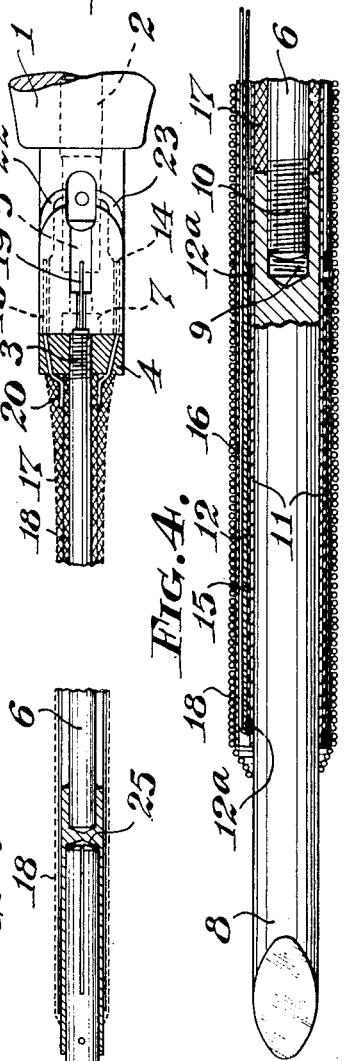
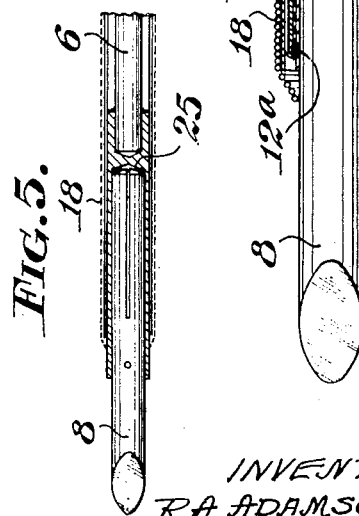
INVENTOR
R. A. ADAMSON.

Patented Aug. 8, 1950

2,518,265

UNITED STATES PATENT OFFICE 2,518,265

ELECTRICALLY HEATED SOLDERING IRON

Robert Alfred Adamson, West Wickham, England

Application November 26, 1946, Serial No. 712,369
In Great Britain November 27, 1945

2 Claims. (Cl. 219—26)

This invention relates to electrically heated soldering irons and in particular to irons for use in soldering joints between wires. It is often necessary to make a soldered connection in a junction box or in a chassis of a wireless set or like place wherein the bit of an iron of conventional form cannot be inserted without risk of damage to the insulation of other wires or cables. Normally, an electrically heated iron employed for such work comprises a body in which is the heating element with a bit projecting therefrom and the cross-sectional dimension of the body is in excess of the cross-sectional dimension of the bit usually termed a pencil bit. Although the bit is of suitable size, it is sometimes impossible to pass the body past closely spaced wires to effect the soldering of connections therebehind. The length of the pencil bit is limited owning to the loss of heat from the heating element to the end thereof.

It is the primary object of this invention to provide an improved construction of iron wherein the cross-sectional size of the body is but little in excess of the cross-sectional size of the bit, and a further object is to provide a construction wherein the loss of heat along the body is reduced to a minimum, thereby ensuring efficient heating of the bit.

Another object of the invention is to provide a soldering iron wherein the bit attains its working temperature quickly whilst a still further object is to provide a construction in which excess heat to the bit is lost to minimise the risk of overheating of the bit under normal usage, whilst also reducing heat conduction to the handle end of the body.

In order that a clear understanding of the invention may be obtained, reference will now be made to the accompanying drawings which illustrate two preferred examples, wherein:

Figure 1 shows one form of iron,

Figure 2 is a sectional view,

Figure 3 is a fragmentary sectional view taken at a right angle to the sectional view Figure 2, with the insulating sleeve removed and showing the arrangement for connecting flexible leads to the element ends, Figure 4 is a fragmentary sectional view to an enlarged scale of the bit and heater element, and Figure 5 is a fragmentary sectional view of an alternative form with a removable bit.

In the drawings, 1 is the handle which may be of wood or synthetic plastic material and is formed with a central hole 2 therethrough, the inner end of the hole having a throat as shown so that the threaded stub 3 projecting through the boss 4 at the end of the main body will pass through the restricted part of said hole. This arrangement provides a convenient method of assembling the handle and body, as the nut 5 can be turned by a long bladed screw driver through the hole 2.

The body is built up on the rod 6 which has a projecting threaded stub at each end, the rod being secured to the boss 4 at one end by the nut 7 on the stub 3, whilst the copper bit 8 has a threaded axial aperture 9 in its inner end to screw on to the other stub 10.

For clearness, the mica or like insulating layers around the bit and the heater element have been omitted from the drawings, except in the enlarged fragmentary view in Figure 4. A sleeve or wrapping of mica 11 surrounds the bit 8 except for the projecting end, and the heating element 12 is wound over this sleeve. The said element consists of a nickel chrome wire of high resistance which is space wound and terminated at each end by binding with similar wire as at 12a, 12a. The leads from each end are taken to connecting pins 13, 14, (Figure 3) and to prevent undue voltage drop the binding wire at each end is brought out in parallel with the heater wire end. A suitable heat resisting preparation may be applied to the heater, to maintain the spacing and prevent contact between adjacent turns.

A layer of mica 15 is wrapped over the heater above which the forward lead is fed to its connecting pin 13, and then the final layer of mica 16 is wrapped around the built-up heater and rod 6. An asbestos sleeve 17 is placed around the rod 6 before the bit is assembled, which sleeve has an outer diameter approximately equal to the diameter of the bit. At least the final layer 16 is wrapped around both the bit and the rod 6 enclosed in its sleeve of asbestos, this layer insulating the heater connecting wires from the outer body.

The outer tube or body 18 is constructed from wire of suitable gauge preferably iron wire, which is wound to a close helix as shown. The front end of this tube is overwound whilst the end adjacent the handle is suitably locked such as by twisting round the earth or frame pin 19 and soldering. This pin is also bonded to the centre rod to ensure efficient earthing of the frame. Around the supporting rod adjacent the boss 4 is a packing of cotton or like material 20, and the wire of the tube is wound around the said packing. The handle is secured to the boss and the boss and a part of the tube adjacent is enclosed in a sleeve 21 of insulating material.

After assembling, the flexible leads are connected to the pins. These leads pass through the hole 2 in the handle, and the earthing wire is soldered to the pin 19. The live lead is brought out through one of the curved slots, for example, the slot 22, which slot curves downwardly and forwardly forming a cord grip for the flexible lead and a channel to house the lead, the end of which is soldered to the pin 13. The other lead is similarly placed in the slot 23 and soldered to the pin 14. It is understood that the connections are made with the cover sleeve 21 removed.

Referring to the construction illustrated in Fig. 5, the forward end of the rod 6 has a sleeve 25 secured thereto, for example by brazing, and the bit 8 is constructed so as to be removable from the end of the body without dismantling the iron. In this case, the heater is wound over the sleeve 25. The bit 8 is arranged to be an easy fit in the sleeve to allow for scale formation and is pinned in position. The said bit is slotted as shown and splayed slightly to prevent wobble.

With an iron constructed as herein described, the bit end which is used for soldering, heats rapidly as the heating element is wound on to the bit, and the heat loss along the outer body portion is reduced to a minimum without unduly weakening the body. The rod may, if desired, be of a material of low heat conductivity to further reduce losses, although it has been found in practice that with a metal rod there is little loss of heat, as a heat insulating layer is interposed between the outer body portion and the rod. It will be observed that the diameter of the bit is but little less than the diameter of the body, which results in a construction particularly suitable for use in the wiring of electrical connections within restricted space.

I claim:

1. An electrically heated soldering iron comprising a bit having a threaded axial socket in one end, a body rod having adjacent one end threads screwed into the socket, an asbestos sleeve surrounding said rod and of a thickness disposing its outer surface flush with the corresponding surface of said bit, a mica means enveloping the sleeve and the adjacent portion of the bit, a space wound heating element coiled about the mica envelope throughout its length, loops of wire each binding an end of the heating element, a mica layer enveloping the heater element, a lead connected to the forward end of the heating coil and extending rearwardly over the mica layer, an exterior layer of mica enveloping the first layer and the forward lead, an outer tube of iron wire covering the exterior mica layer and at its forward end the adjacent part of the bit.

2. The soldering iron according to claim 1 and also comprising cotton like material surrounding the end of the rod remote from the bit and around by the end portion of the iron wire.

ROBERT ALFRED ADAMSON.

REFERENCES CITED

The following references are of record in the file of this patent:

UNITED STATES PATENTS

| Number | Name | Date |
|---|---|---|
| 23,351 | Connel | Mar. 29, 1859 |
| 460,978 | Mitchell | Oct. 13, 1891 |
| 1,234,570 | Rink | July 24, 1917 |
| 1,478,319 | Young | Dec. 18, 1923 |
| 1,589,843 | De Lisle | June 22, 1926 |
| 2,383,699 | Atkinson | Aug. 28, 1945 |